(12) United States Patent
Teraoka et al.

(10) Patent No.: US 7,971,787 B2
(45) Date of Patent: Jul. 5, 2011

(54) COMMODITY-VENDING SYSTEM AND WEIGHT-SCALE APPARATUS

(75) Inventors: Kazuharu Teraoka, Tokyo (JP); Lim Kok Hooi, Singapore (SG)

(73) Assignee: Teraoka Seiko Co., Ltd., Tokyo (JP)

( * ) Notice: Subject to any disclaimer, the term of this patent is extended or adjusted under 35 U.S.C. 154(b) by 699 days.

(21) Appl. No.: 12/028,162

(22) Filed: Feb. 8, 2008

(65) Prior Publication Data
US 2009/0072028 A1    Mar. 19, 2009

(30) Foreign Application Priority Data
Feb. 9, 2007  (JP) ................ 2007-030679

(51) Int. Cl.
*G06K 15/00* (2006.01)
(52) U.S. Cl. .................. 235/383; 235/375
(58) Field of Classification Search .............. 235/383, 235/375
See application file for complete search history.

(56) References Cited

U.S. PATENT DOCUMENTS

| | | | |
|---|---|---|---|
| 7,624,922 B2 * | 12/2009 | Brown | 235/381 |
| 2003/0024982 A1 * | 2/2003 | Bellis et al. | 235/383 |
| 2007/0005379 A1 | 1/2007 | Juan-Castellanos et al. | |

FOREIGN PATENT DOCUMENTS
JP    4149799    5/1992

OTHER PUBLICATIONS

International Search Report dated Jun. 16, 2008, for corresponding European Patent Application 08151208.9.
The Extended European Search report dated Jun. 16, 2009, for corresponding European Patent Application 08151208.9.

* cited by examiner

*Primary Examiner* — Karl D Frech
(74) *Attorney, Agent, or Firm* — K&L Gates LLP

(57) ABSTRACT

When a customer picks up a commodity at a store aisles and operates a tag device, a PLU code of the commodity is transmitted from the tag device to a weight-scale apparatus. The terminal device is provided corresponding to each commodity. The weight-scale apparatus upon receiving the PLU code increments a counter value (prepared per commodity) in only one step, and displays a commodity icon corresponding to the PLU code on a liquid-crystal touch panel. The counter value increments every time the PLU code is received. The weight-scale apparatus subsequent to weighing issues a label and decrement only a step of the counter value. The icon corresponding to the counter value continues to be displayed unless the counter value does not indicate "0 (zero)". The icon is erased when the counter value indicates "0 (zero)". This results in providing superior operations in weighing and selecting various types of commodities, displayed at the store aisles, that are objects to be weighed.

11 Claims, 6 Drawing Sheets

| PLU CODE | ARTICLE NAME | UNIT PRICE | WEIGHT (g) | PACKAGE PRICE | ICON NAME | ... |
|---|---|---|---|---|---|---|
| ⋮ | ⋮ | ⋮ | ⋮ | ⋮ | ⋮ | |
| 3291 | APPLE | JP¥120 | 235 | JP¥ 500 FOR 5 PIECES | APPLE | |
| ⋮ | ⋮ | ⋮ | ⋮ | ⋮ | ⋮ | |

| NUMBER | PLU CODE | ICON COUNTER | TIME MEMORY |
|---|---|---|---|
| 1 | | | |
| 2 | | | |
| 3 | | | |
| ⋮ | | | |
| 18 | | | |

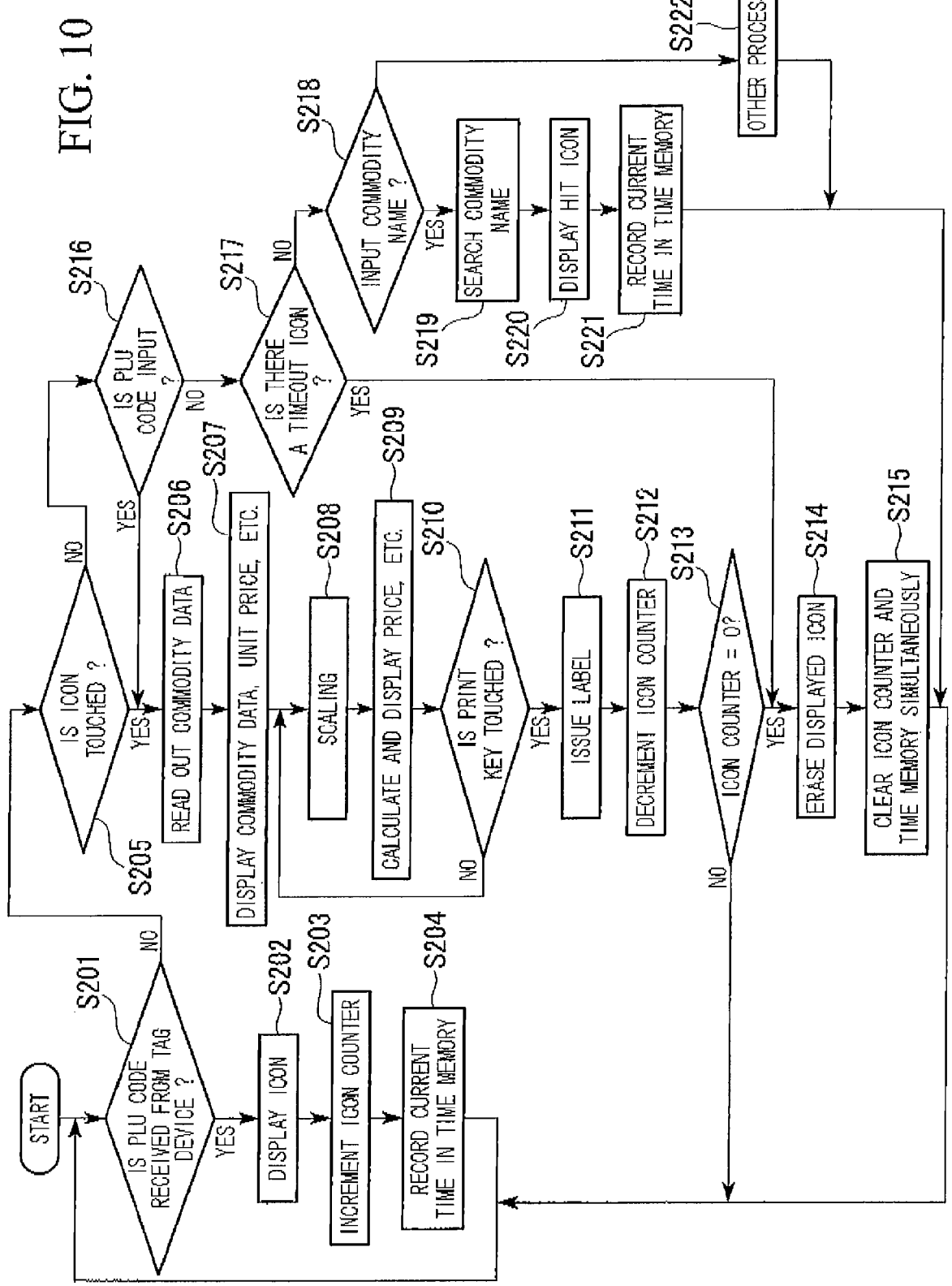

COMMODITY-VENDING SYSTEM AND WEIGHT-SCALE APPARATUS

BACKGROUND OF THE INVENTION

1. Field of the Invention

The present invention relates to a commodity-vending system and a weight-scale apparatus.

The present application is based on patent application No. 2007-030679 filed Feb. 9, 2007 in Japan, the contents of which are incorporated herein by reference.

2. Background Art

The present invention relates to a commodity-vending system and a weight-scale apparatus, and in particular, to a commodity-vending system and a weight-scale apparatus that undertake weight-scaling and vending of commodities in store aisles.

In western countries, perishable foods, e.g., vegetables and fruits displayed for sale in supermarket stores are usually categorized and stacked along store aisles. Customers put commodities they need into plastic bags free of charge and bring them to a cash register because a label indicating a price and a barcode is not attached to every commodity. The cash register registers the commodities by weighing each bag of commodity to retrieve unit price of the commodity and by operating preset keys provided to the cash register to obtain a subtotal price based on the resulting weight value multiplied by the unit price.

Also, a Patent Document 1 proposes a commodity-vending system having a pricing apparatus, provided at commodity showcase areas (store aisles), that issues a label indicating the weight of a commodity calculated by a customer who is going to purchase.

[Patent Document 1] Japan Patent No. 2,983,605

Incidentally, the preset keys used in a conventional method of commodity selection have a limit in number because an apparatus has a limited screen area to indicate the preset keys at a time; therefore, allocation of the preset keys corresponding to hundreds of merchandizing commodity variations must undergo, e.g. hierarchical categorization. Several times, e.g., three or four times of preset key selection that must be conducted until reaching the aiming commodity are problematic, i.e., time-consuming and complex in operation. Weighing and registering various commodities at a cash register, and issuing labels as previously described are problematic with respect to operability; thus, unpractical.

Commodity registration using a self-cash register, that expects widespread use in future, necessitating the aforementioned complex operations of the preset keys may be confusing to a customer who cannot find a preset key in mind.

SUMMARY OF THE INVENTION

The present invention was conceived in consideration of the aforementioned circumstances, and an object thereof is to provide a commodity-vending system and a weight-scale apparatus that can provide superior operability in weighing and selecting of various type of commodities, exhibited in store aisles, that will be objects to be weighed.

In order to solve the aforementioned problems, the present invention provides a commodity-vending system that includes: terminal devices, provided per type of commodity displayed on store aisles, for transmitting an instruction information that designates the commodity based on the customer's operation; and a weight-scale apparatus that weighs each commodity. The weight-scale apparatus includes: a storage unit that stores commodity information associated with the commodity; a receiver unit that receives the instruction information transmitted from the terminal device; an indicator unit that displays commodity selection-associated information for selecting commodity information of the commodity designated by the previously received instruction information; a weight-scale unit that weighs the commodity placed thereon; a label-issuing unit that reads out commodity information from the storage unit in accordance with the commodity selection-associated information designated by the customer, and issues a label based on the read-out commodity information and the weighed weight; and a control unit that stores a counter number indicating the number of receiving the instruction information per commodity; subtracts the counter number corresponding to the label issued per commodity; and erases the corresponding commodity selection-associated information from the indicator unit based on the counter number that indicates zero.

In the present invention, if the customer picks up a commodity at the store aisles and operates the terminal device, a instruction information of the commodity is transmitted from the terminal device to the weight-scale apparatus. The terminal device is provided corresponding to each commodity. The weight-scale apparatus upon receiving the instruction information increments a counter value (prepared per commodity) in only one step, and displays the commodity selection-associated information (e.g., a commodity icon) corresponding to the instruction information on the indicator unit. The counter value increments every time the instruction information of the commodity is received. Since the commodity selection-associated information of the purchasing commodity picked up by the customer is displayed on the weight-scale apparatus, the weight-scale apparatus can select her or his commodity from the displayed commodity selection-associated information and weigh the commodity. The weight-scale apparatus subsequent to weighing issues a label and decrement only a step of the counter value. The commodity selection-associated information maintains the displayed condition unless the counter value does not indicate "0 (zero)". The commodity selection-associated information is erased when the counter value indicates "0 (zero)".

Therefore, the weight-scale apparatus of the present invention can find an object easily among the displayed commodity selection-associated information corresponding to various types of commodities since the weight-scale apparatus displays the commodity selection-associated information based on the received instruction information; and since only the commodity selection-associated information is displayed associated with the commodity corresponding to the terminal device that has been operated by the customer.

All the customers weighing the commodity can find the object based on the displayed commodity selection-associated information since the commodity selection-associated information continues to be displayed until the counter value indicates "0 (zero)" in a case where, e.g., the customers each operate the terminal device several times. Therefore, many customers purchasing the same commodity and using the weight-scale apparatus can obtain the same operability. In addition, the commodity selection-associated information of the greater number of types can be displayed simultaneously than in a case where a plurality of same commodity selection-associated information are displayed when the terminal device is operated.

In addition, an operation of selecting a commodity to the corresponding terminal device is not necessary because the terminal device is provided to each commodity type. Therefore, the customer can reduce operations for picking up the commodity at the store aisles.

In addition, the present invention is characterized in that the terminal device in the aforementioned commodity-vending system further includes a alarm unit that provides a predetermined time of alarm notifying an operation that has been conducted by the customer.

The present invention allows the customer who operates the terminal device to recognize proper operations.

Also, the present invention is characterized in that, in the aforementioned commodity-vending system, the commodity selection-associated information is erased from the indicator unit if the commodity selection-associated information displayed by the indicator unit has not been designated for a predetermined length of time.

The present invention can display only necessary commodity selection-associated information because the unnecessary commodity selection-associated information is erased when the commodity selection-associated information is not necessary to be displayed on the weight-scale apparatus, due to, e.g., erroneous operation to the terminal device.

Also, the present invention is characterized in that, in the aforementioned commodity-vending system, the commodity information includes the weight of the commodity per piece and a discount information associated with package price established for a predetermined quantity, and the weight-scale apparatus calculates commodity quantity based on the weight weighed by the weight-scale unit and the weight per piece of the commodity and issues the label based on the discount information.

The present invention can provide package price discount at the cash register by a label issued in view of discount information of package price.

Also, the present invention is characterized in that, in the commodity-vending system, the weight-scale apparatus further includes a character-inputting unit; and a query unit that retrieves a commodity having a commodity name including characters input by the character-inputting unit. The weight-scale apparatus displays the commodity selection-associated information of the retrieved commodity on the indicator unit.

The present invention can conduct weighing by using the commodity selection-associated information displayed by means of a query unit; and the customer does not have to come back to the terminal device corresponding to the commodity even if the customer has not conducted operations to the terminal.

Also, the present invention is characterized in that the commodity-vending system further includes a commodity-registering device that undertakes commodity registration upon reading the label issued by the label-issuing unit operated by the customer.

The present invention can provide commodity registration associated with the weighed commodity. The commodity-registering device is e.g., a self cash register. The customer herself or himself can weigh per-piece commodity, e.g., perishable food and conduct commodity registration in a store that has introduced the self cash register.

Also, the present invention provides a commodity-vending system that includes: terminal devices, provided per type of commodity displayed on store aisles, for transmitting an instruction information that designates the commodity based on the customer's operation; and a weight-scale apparatus that weighs each commodity. The weight-scale apparatus includes: a storage unit that stores commodity information associated with the commodity; a receiver unit that receives the instruction information transmitted from the terminal device; an indicator unit that displays commodity selection-associated information for selecting commodity information of the commodity designated by the previously received instruction information; a weight-scale unit that weighs the commodity placed thereon; a label-issuing unit that reads out commodity information from the storage unit in accordance with the commodity selection-associated information designated by the customer, and issues a label based on the read-out commodity information and the weighed weight; and a control unit that stores a counter number indicating the number of receiving the instruction information per commodity; subtracts the counter number corresponding to the label issued per commodity; and erases the corresponding commodity selection-associated information from the indicator unit based on the counter number that indicates zero.

Also, the present invention provides a weight-scale apparatus for weighing a commodity, that includes: a storage unit that stores commodity information associated with the commodity; a receiver unit that receives the instruction information transmitted from the terminal device; an indicator unit that displays commodity selection-associated information for selecting commodity information of the commodity designated by the previously received instruction information; a weight-scale unit that weighs the commodity placed thereon; a recording unit that reads out commodity information from the storage unit in accordance with the designated commodity selection-associated information, and records the read out commodity information and the resulting weight; and a control unit that stores a counter number indicating the number of receiving the instruction information per commodity; subtracts the counter number corresponding to the label issued per commodity; and erases the corresponding commodity selection-associated information from the indicator unit based on the counter number that indicates zero.

The present invention can provide superior operations in weighing and selecting various types of commodities, displayed at the store aisles, that are objects to be weighed.

BRIEF DESCRIPTION OF THE DRAWINGS

FIG. 10 is a flowchart showing operations of the weight-scale apparatus.

PREFERRED EMBODIMENTS

An embodiment of the present invention will be explained in detail with reference to drawings as follows.

Figure 1:
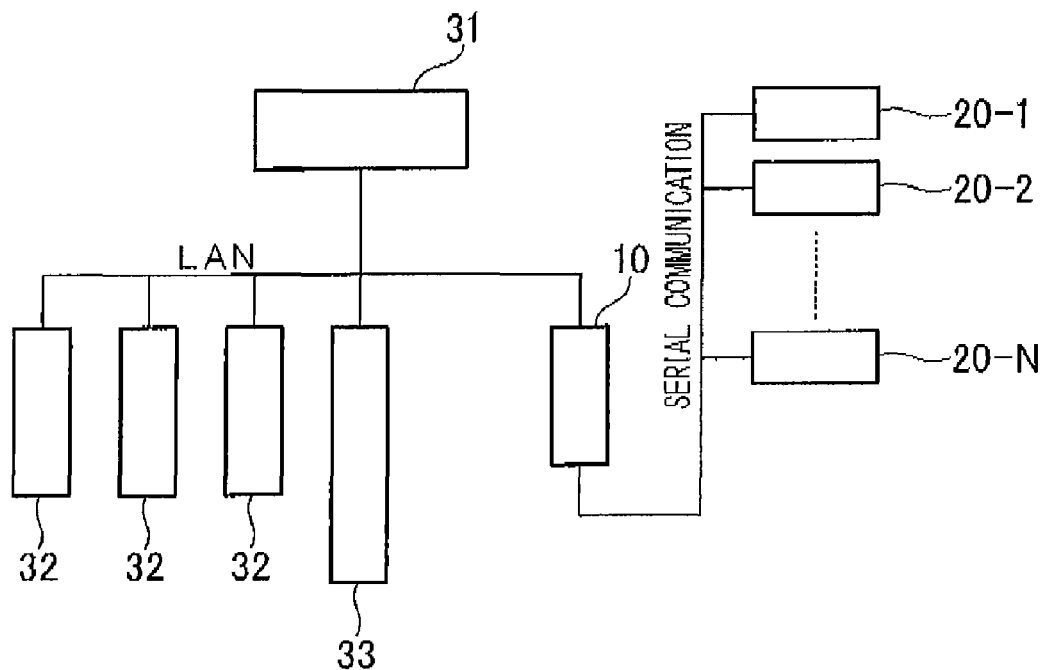
FIG. 1 shows the configuration of a commodity-vending system according to an embodiment of the present invention.
Figure 2:
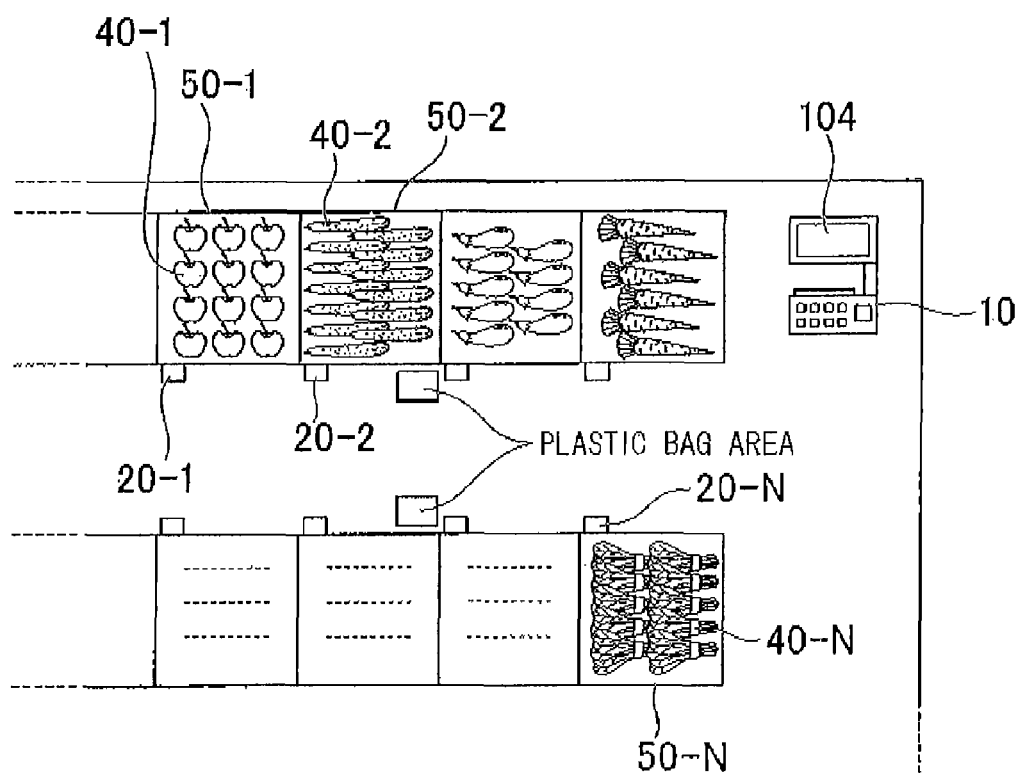
FIG. 2 shows store aisles for perishable food allocated in a supermarket using the commodity-vending system having the configuration shown in FIG. 1.

FIG. 1 shows the configuration of a commodity-vending system according to an embodiment of the present invention. The commodity-vending system is installed in a supermarket that merchandizes perishable food, e.g., vegetables or fruits. Commodities 40-1 to 40-N, e.g., perishable foods merchandized per piece are categorized and stacked on showcase areas 50-1 to 50-N along a store aisle in the supermarket. In addition, tag devices 20-1 to 20-N (terminal devices) are provided corresponding to the commodity per showcase area 50. A weight-scale apparatus 10 issues a label that indicates a commodity that is subject to payment upon obtaining the weight of a necessary quantity of commodity per categorization put into a plastic bag by a customer since every commodity merchandized per piece does not have a label showing a price or a barcode printed thereon. Subsequently, the customer attaches the issued label to the plastic bag containing the commodity that a POS terminal 32, etc. will undertake commodity registration thereof.

A touch sensor section (see FIG. 4 that will be explained later) provided to each tag device 20 upon detecting a customer's operation (touch) transmits a stored PLU (Price Look Up) code to the weight-scale apparatus 10. The PLU code, i.e., a commodity identification number (instruction information) for identifying a commodity type designates a commodity correlated to the tag device. The aforementioned touch operation is provided to the tag device 20 corresponding to a purchasing commodity that is put into a plastic bag. Accordingly, the PLU code of the commodity weighed by the weight-scale apparatus 10 is transmitted from each tag device 20 to the weight-scale apparatus 10. It should be noted that each tag device 20 connected to the weight-scale apparatus 10 enables serial communication, using e.g., an RS-232C interface.

The weight-scale apparatus 10 upon receiving the PLU code from the tag device 20 displays a commodity icon (commodity selection-associated information) corresponding to the received PLU code on a screen of a liquid-crystal touch panel. Certainly, a plurality of received PLU codes may be displayed on the screen. In addition, the weight-scale apparatus 10 weighs a commodity placed on a weight-scaling section (scale); retrieves a commodity data, e.g., a commodity unit price corresponding to the icon selected by the customer on the liquid-crystal touch panel 104 from a storage section (RAM); calculates a commodity price; and issues a label.

A POS terminal 32 and a self POS terminal 33 (commodity-registering device) are so-called cash registers that direct commodity registration and payment of commodities, including perishable food weighed by the weight-scale apparatus 10 and previously-labeled commodities, purchased by the customer. The POS terminal 32 is operated by a salesclerk, and the self POS terminal 33 is operated by the customer herself or himself. A barcode printed on the commodity label indicates a commodity identification number, e.g., a PLU code. A barcode printed on the commodity label issued by the weight-scale apparatus 10 indicates a weight-based price information. The POS terminal 32 and the self POS terminal 33 each have a reading device, e.g., a barcode reader. Subsequently, the POS terminal 32 and the self POS terminal 33 govern a procedure of commodity registration based on the barcode information read by the reading device and a commodity-vending price stored in memories.

A store-controller 31, i.e., a computer that directs various data control in the supermarket is connected to the weight-scale apparatus 10, the POS terminal 32, and the self POS terminal 33A via a LAN (Local Area Network). The various data include: a commodity file including commodity-vending price information stored by the POS terminal 32 and the self POS terminal 33; a PLU file, which will be explained later (see FIG. 6), stored in the weight-scale apparatus 10; or a record file transmitted by the POS terminal 32 and the self POS terminal 33.

Figure 3:
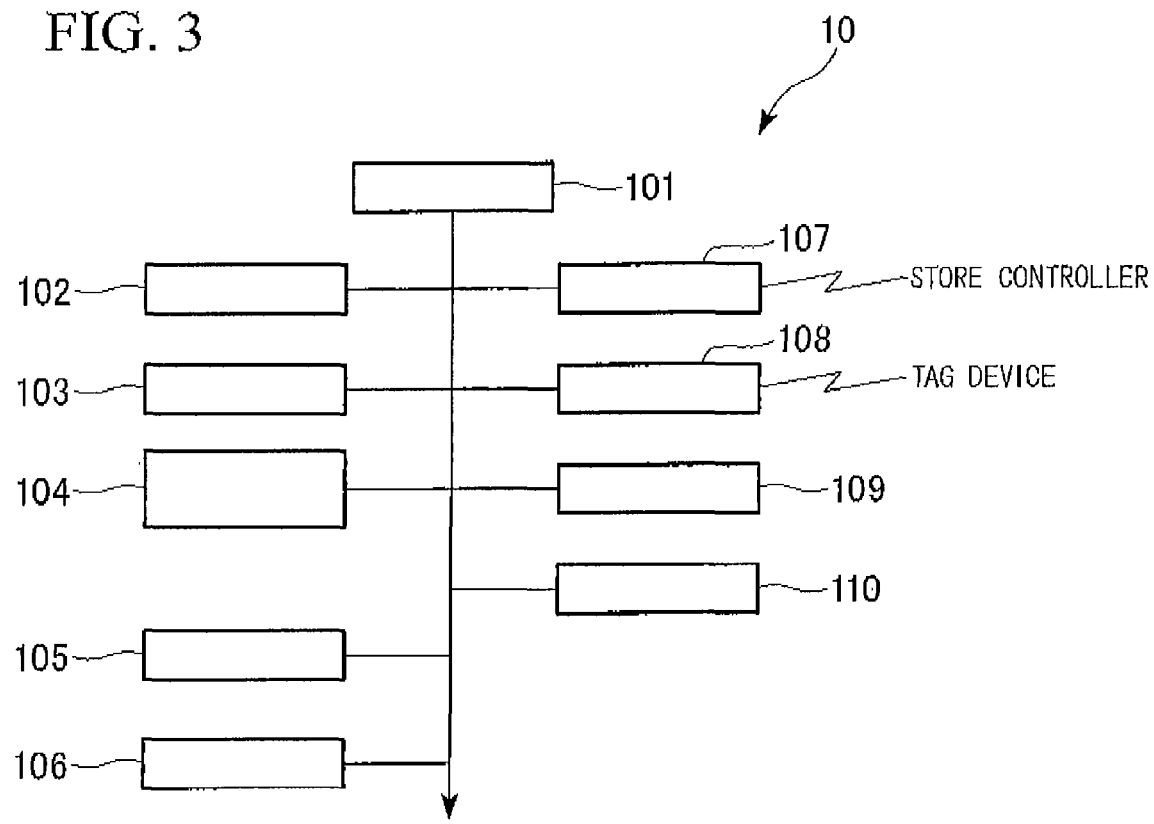
FIG. 3 is a block diagram showing components of a weight-scale apparatus.

FIG. 3 is a block diagram showing components of a weight-scale apparatus 10. The weight-scale apparatus 10 has a CPU 101, a ROM 102, a RAM 103, a liquid-crystal touch panel 104, a key operation section 105, a timepiece section 106, a first communication section 107, a second communication section 108, a weighing section 109, and a print section 110.

The CPU 101, i.e., a central processing unit that provides operation control to the weight-scale apparatus 10 executes a program read out from the ROM 102 and achieves the operation of the weight-scale apparatus 10 based on the program. The ROM 102 is a read-only memory that stores the aforementioned program. The RAM 103 is a random-access memory that stores a PLU file, an icon table, or other temporary data, etc., that will be explained later.

The liquid-crystal touch panel 104, i.e., an I/O interface between a user, i.e., the customer and the weight-scale apparatus 10 operated by the customer indicates an icon or various types of other information for use in selection of a commodity that undergoes weighing on a screen; and receives selection made and input by the customer with respect to the indicated icon. A PLU code transmitted by the tag device 20 and received by the second communication section 108 determines an icon displayed on the liquid-crystal touch panel 104. An example of a displayed screen on the liquid-crystal touch panel 104 will be explained later (see FIG. 8). In addition, calculation of a commodity price is based on a commodity data corresponding to the icon selected on the screen by the customer. The commodity data is read out from a PLU file stored in the RAM 103.

The key operation section 105 attends to data input not by the liquid-crystal touch panel 104.

The timepiece section 106 outputs a time information. The time information controls duration of an icon displayed on the liquid-crystal touch panel 104.

The first communication section 107 is an LAN interface that controls a communication between the store-controller 31 and the weight-scale apparatus 10. The PLU file is obtained from the store-controller 31 via the first communication section 107.

The second communication section 108 is a serial interface that controls communication between each tag device 20 and the weight-scale apparatus 10. The PLU code transmitted from each tag device 20 is received by the second communication section 108.

The weight-scale section 109 weighs a commodity placed on a scale pan provided to an upper section of a unit body of the weight-scale apparatus 10 and outputs the resulting weight value.

The 16 issues a label indicating a price and a barcode printed thereon with respect to the commodity weighed by the weight-scale section 109. Characters printed on the label indicates the resulting weight value output by the weight-scale section 109 and a commodity information, e.g. unit price data associated with the commodity in the PLU file stored in the RAM 103.

Figure 4:
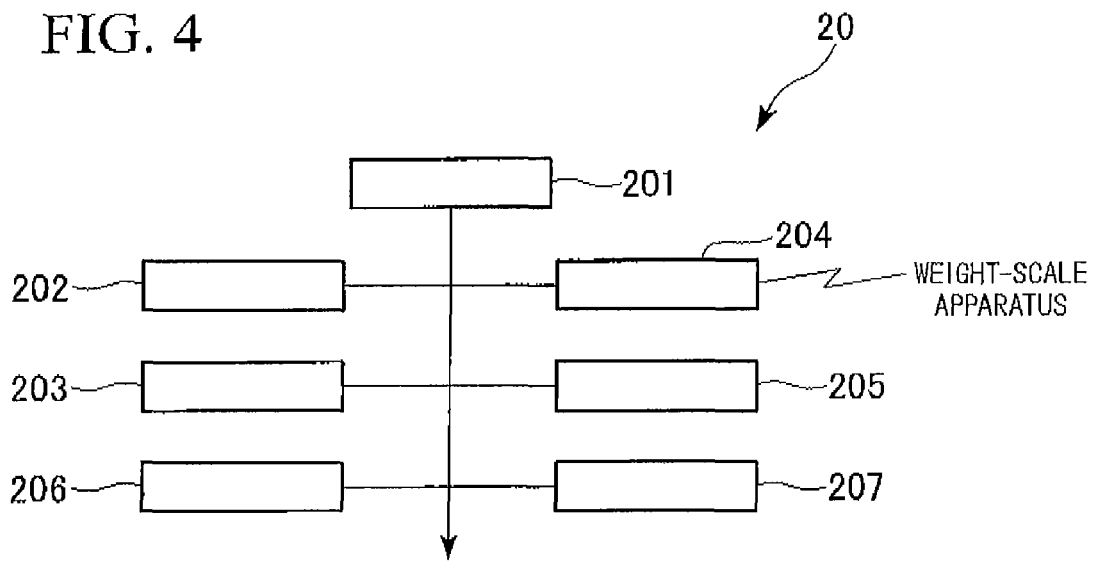
FIG. 4 is a block diagram showing components of a tag device.

FIG. 4 is a block diagram showing components of the tag device 20. The tag device 20 has a CPU 201, a ROM 202, a RAM 203, a communication section 204, a touch sensor section 205, an alarm lamp 206, and an alarm buzzer 207.

The CPU 201, i.e., a central processing unit that provides operation control to the tag device 20 executes a program read out from the ROM 202 and achieves the operation of the tag device 20 based on the program. The ROM 202 is a read-only memory that stores the aforementioned program. The RAM 203 is a random-access memory that stores a PLU code associated with a commodity (displayed in a showcase area having the tag device provided thereof) correlated to the tag device.

The communication section 204 is a serial interface that controls communication between the weight-scale apparatus 10.

The PLU code stored in the RAM 203 is transmitted to the weight-scale apparatus 10 via the communication section 204.

The touch sensor section 205 detects a contact made by the customer. The touch sensor section 205 upon detecting the operation (touch) causes the alarm lamp 206 to illuminate for a predetermined length of time, and the alarm buzzer 207 to emit sound for a predetermined length of time.

Figures 5, 6, 7:
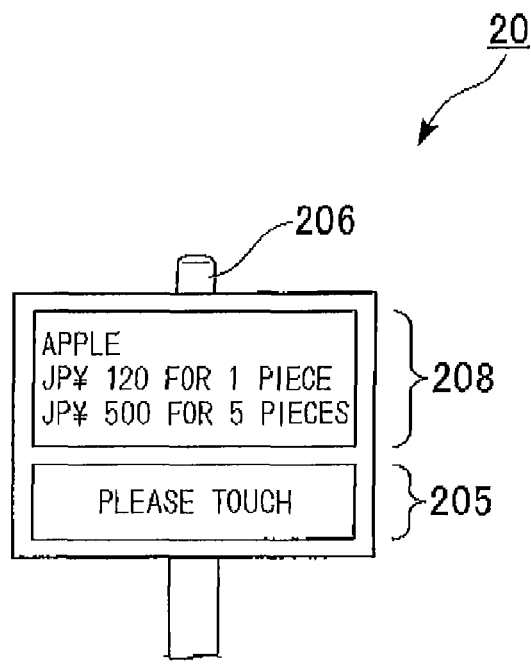
FIG. 5 is an external front view of the tag device.
FIG. 6 shows an example of a PLU file.
FIG. 7 shows an example of an icon table.

FIG. 5 is an external front view of the tag device 20.

Provided on a visible side for the customer, i.e., the front end, of the tag device 20 are the touch sensor section 205, the alarm lamp 206, and the commodity information-displaying section 208. Characters "Please touch" printed on the touch sensor section 205 prompts the customer picking up a commodity to touch the touch sensor section 205. The commodity information-displaying section 208 posts a commodity guide paper showing commodity information including a commodity name and a commodity price printed thereon. For example, commodity guide prepared to coincide with the detail of the PUL file indicates "A piece of apple: JP\ 120.-; Five pieces: JP\ 500.-", etc. It should be noted that the commodity information-displaying section 208 may be configured to be a liquid-crystal display, etc. to provide electronic indication, or an electronic tag that shows a price date, received from the store-controller 31, etc., on the liquid-crystal display.

FIG. 6 shows an example of the PLU file.

The PLU file stores item data including PLU code, article name, unit price, weight, package price, and icon name per commodity that is an object to be weighed by the weight-scale apparatus 10. The PLU file upon being produced by the store-controller 31 is transmitted to the weight-scale apparatus 10 and stored in the RAM 103.

The weight data, i.e., an average weight established for a piece of commodity, is used for calculating the commodity quantity based on the weight value obtained by the weight-scale apparatus 10. Therefore, data of this type is set only for single piece price commodity, e.g., apple. Price of a non-single piece price commodity, e.g., processed meat, etc. is calculated based on only a unit price data (gram-based unit price). Unit price data associated with single piece price commodity establishes a price for a piece. Unit price data associated with per-gram price commodity establishes a price per 100 grams, etc.

FIG. 7 shows an example of icon table produced and stored by the RAM 103 in the weight-scale apparatus 10. Item data stored in the icon table are a PLU code, an icon counter, and a time memory. The icon table used here allows the weight-scale apparatus 10 to handle commodity icons displayed on the screen of the liquid-crystal touch panel 104. The number of icons that can be displayed simultaneously on the liquid-crystal touch panel 104 is limited. In this case, the number is 18. The icon table has entries corresponding to numbers 1 to 18. Each number indicates the position of an icon displayed on a screen of the liquid-crystal touch panel 104.

To be more specific, the weight-scale apparatus 10 upon receiving the PLU code from the tag device 20 determines as to whether the PLU code exists in the icon table. If the determination indicates the absence of the PLU code, the weight-scale apparatus 10 adds another PLU code to a vacant entry, while establishing a number 1 in the icon counter and setting a current time in the time memory. Subsequently, a commodity icon is displayed at the position corresponding to the entry. For example, an apple icon is displayed at a position corresponding to number 1 on the screen of the liquid-crystal touch panel 104 since a PLU code corresponding to the number 1 is "3921" associated with apple on the icon table shown in FIG. 7.

Figure increases by one in the icon counter that corresponds to the entry having the PLU code previously existing in the icon table, and the time memory is set at a current time. The screen does not change indication thereon in this case since the commodity icon has already been displayed. The figure of the icon counter increases one by one every time the PLU code of the same commodity is received in this manner.

In addition, the weight-scale apparatus 10 decreases a figure of the icon counter by one associated with the entry of the PLU code of the commodity in the icon table when the customer selects an icon displayed on the screen of the liquid-crystal touch panel 104; weighing of the corresponding commodity is executed; and a label is issued. Subsequently, the weight-scale apparatus 10 upon detecting a figure "0 (zero)" in the icon counter deletes the entry from the icon table and erases the commodity icon on the screen. The entry is not deleted and the icon is not erased unless the figure of the icon counter is "0 (zero)".

In summary, the icon counter indicates the number of customers who have not weighed. Therefore, the commodity icon continues to be displayed on the screen of the liquid-crystal touch panel 104 until the icon counter indicates "0 (zero)".

Figure 8:
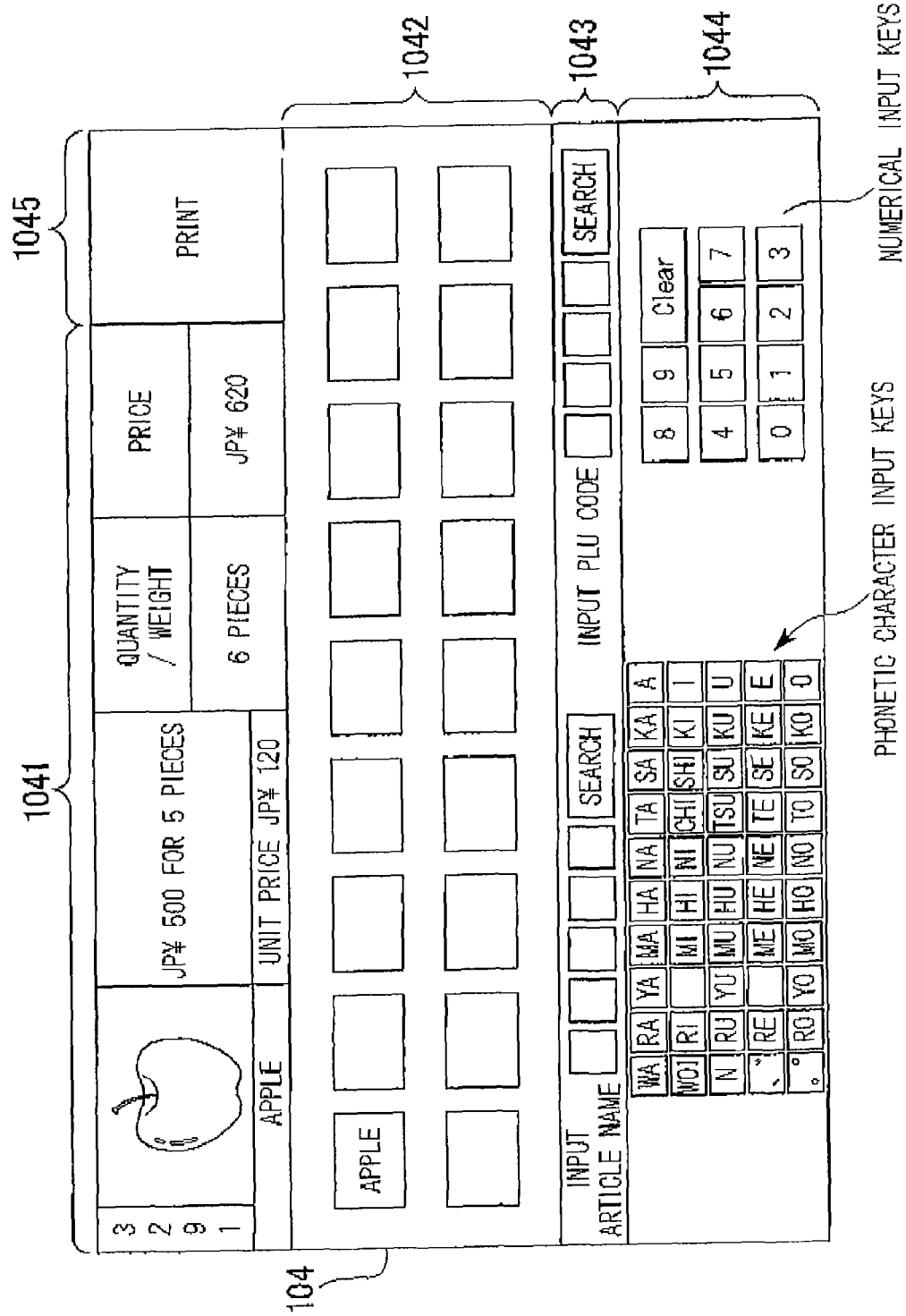
FIG. 8 is an example of image layout on a liquid-crystal touch panel.

FIG. 8 shows an example of screen layout of the liquid-crystal touch panel 104. Arranged on the screen of the liquid-crystal touch panel 104 are a selected commodity-displaying area 1041, an icon-displaying area 1042, a query area 1043, a soft-key-displaying area 1044, and a print key 1045.

The icon-displaying area 1042 shows the icon of a commodity that is entered in the icon table. The customer touches a commodity icon corresponding to the purchasing one of commodity icons displayed on the icon-displaying area 1042 to obtain the weight of the commodity. Touching the print key 1045 subsequent to the weighing causes the weight-scale apparatus 10 to issue a label based on the resulting weight.

The selected commodity-displaying area 1041 displays the commodity information corresponding to the icon selected by the customer on the icon-displaying area 1042, e.g., a PLU code retrieved from the PLU file, article name, icon (icon image), unit price, package price, commodity quantity, and commodity price, etc. The commodity quantity is calculated by dividing the resulting weight obtained by the weight-scale apparatus 10 by the weight of the PLU file. The commodity price is calculated by multiplying the unit price listed in the PLU file with the aforementioned calculated commodity quantity associated with a single piece price commodity. In a case of the per-gram price commodity, the commodity price is calculated by multiplying the unit price listed in the PLU file with the resulting weight. Package price in the PLU file is adapted to calculate a price for package vending.

Provided in the query area 1043 are a column undertaking an input for commodity name retrieval and a column undertaking an input for PLU code retrieval. In addition, the soft-key-displaying area 1044 displays Japanese 50-phonetic-character keys and numerical keys. Inputting a part of commodity name or a PLU code into the columns of the icon-displaying area 1042 by using the phonetic character keys and the numerical keys can retrieve and call a potential corresponding commodity icon, and display the icon in the icon-displaying area 1042. This function is used in a case where the customer does not remember to operate the touch sensor section 205 of the tag device 20.

Figure 9:
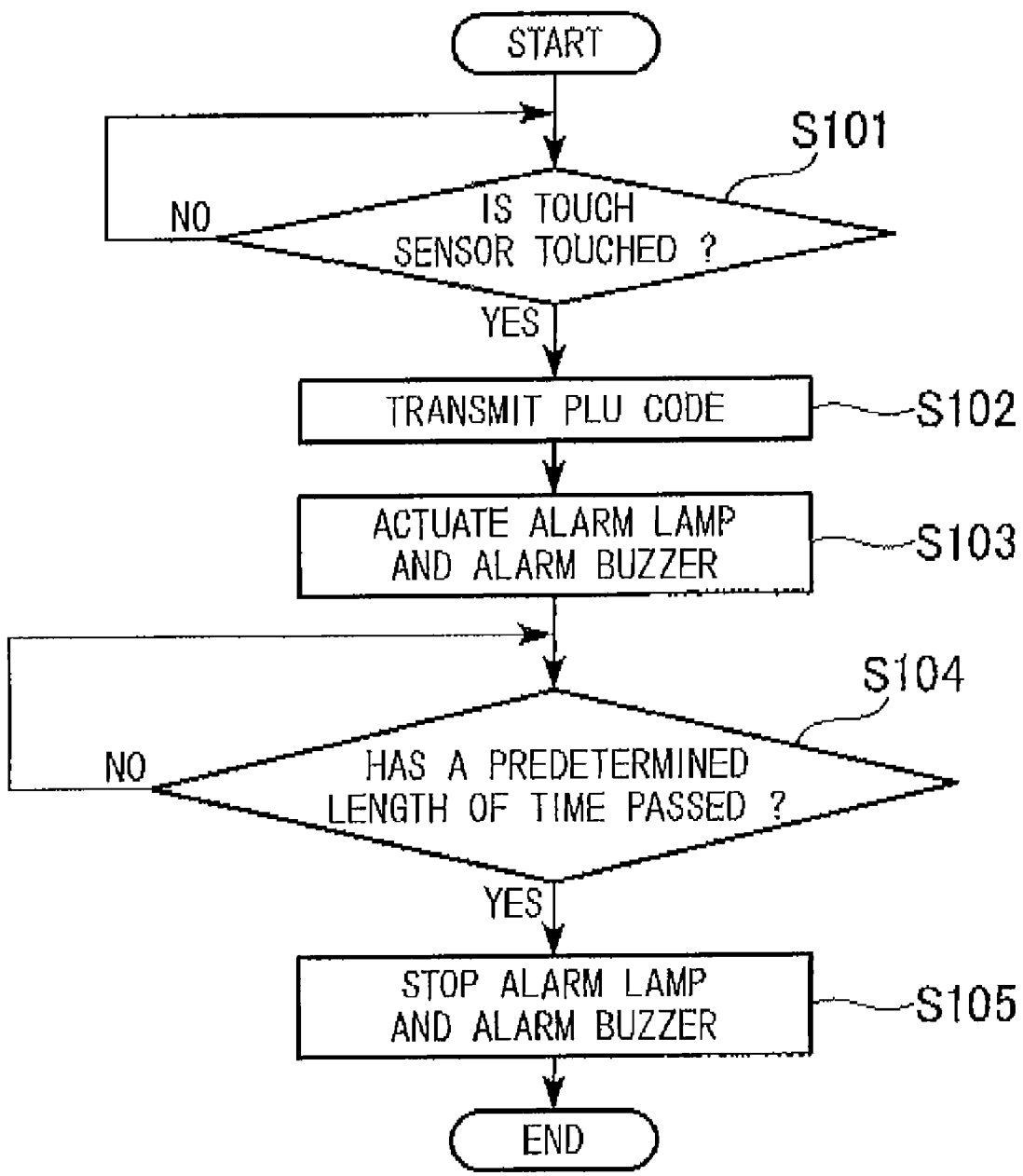
FIG. 9 is a flowchart showing operations of the tag device.

FIG. 9 is a flowchart showing operations of the tag device 20.

The tag device 20 determines in step S101 as to whether or not the customer has touched the touch sensor section 205. The tag device 20 in step S102 upon detecting a determination indicating a touch to the touch sensor section 205 transmits a PLU code of the commodity correlated to the tag device 20 and stored in the RAM 203 to the weight-scale apparatus 10. In addition, the tag device 20 actuates the alarm lamp 206 and the alarm buzzer 207 in step S103; determines in step S104 as to whether or not a predetermined length of time has passed; and suspends operations of the alarm lamp 206 and the alarm buzzer 207 in step S105 upon passing the predetermined length of time.

FIG. 10 is a flowchart showing operations of the weight-scale apparatus 10.

The weight-scale apparatus 10 in step S201 determines as to whether or not the PLU code transmitted by the tag device 20 has been received. The weight-scale apparatus 10 in step S202 having received the PLU code determines as to whether or not the received PLU code exists in the icon table. The weight-scale apparatus 10 upon determining an absence of the PLU code adds an entry of the PLU code to the icon table; reads out the icon name of the commodity of the PLU code from the PLU file; and displays the icon having the read-out icon name in the icon-displaying area 1042 of the liquid-crystal touch panel 104. An entry of the received PLU code previously existing in the icon table is not added to the icon table. The procedure moves to a next step without changing the commodity icon since it has already been displayed on the liquid-crystal touch panel 104.

Subsequently, the weight-scale apparatus 10 in step S203 adds another icon counter corresponding to the entry associated with the received PLU code in the icon table. Also, a current time (time when the PLU code is received) is recorded by a time memory of the entry in step S204 based on a time information output from the timepiece section 106.

The weight-scale apparatus 10 repeats the aforementioned steps S201 to S204 every time the weight-scale apparatus 10 receives a PLU code from the tag device 20 (tag devices provided per commodity type). This continues to update the icon table since all commodity icons that the customer intends to purchase are displayed in the icon-displaying area 1042 of the liquid-crystal touch panel 104; and since the entries corresponding to the icons are provided to the icon table.

The weight-scale apparatus 10 based on an absence of a next PLU code in the aforementioned step S201 determines in step S205 as to whether or not icons displayed in the icon-displaying area 1042 of the liquid-crystal touch panel 104 have been operated (touched). The weight-scale apparatus 10 in step S206 upon detecting a touch to the icon specifies a PLU code (associated with a commodity corresponding to the operated icon) from the icon table based on the touched position on the icon-displaying area 1042, and in addition, the weight-scale apparatus 10 reads out data, e.g., article name, unit price, weight, and package price from the entry of the PLU code in the PLU file based on the specified PLU code.

Subsequently, the weight-scale apparatus 10 in step S207 displays the read-out data in the selected commodity-displaying area 1041 of the liquid-crystal touch panel 104. Subsequent to placement of the commodity onto a weight-scale section 109, the weight-scale apparatus 10 in step S208 weighs the placed commodity.

Subsequently, in step S209, the weight-scale apparatus 10 divides the resulting weight obtained by the weight-scale section 109 by the previously established weight data of a single piece price commodity read out in the aforementioned step S206. The weight-scale apparatus 10 displays the resulting weight value, i.e., the commodity quantity weighed in the aforementioned step S208 in the selected commodity-displaying area 1041 of the liquid-crystal touch panel 104. In case of per-gram price commodity, i.e., wherein the weight data read out in the aforementioned step S206 does not have a previously established value, the weight-scale apparatus 10 displays the resulting weight value obtained by the weight-scale section 109 in the selected commodity-displaying area 1041 of the liquid-crystal touch panel 104. In addition, the weight-scale apparatus 10 multiplies the commodity quantity or the resulting weight by the unit price read out in the aforementioned step S206; and displays the resulting commodity price in the selected commodity-displaying area 1041 of the liquid-crystal touch panel 104.

Subsequently, the weight-scale apparatus 10 in step S210 determines as to whether or not the print key 1045 of the liquid-crystal touch panel 104 has been operated. The weight-scale apparatus 10 upon detecting an operation conducted to the print key 1045 prints and issues a commodity label indicating the aforementioned weight and price obtained as previously explained. Printed on the label are a barcode indicating the PLU code and the calculated price, and character information indicating the article name and the price, etc.

Subsequent to issuing of the label, the weight-scale apparatus 10 in step S212 decrements the icon counter of the entry corresponding to the PLU code (associated with the commodity that has undertaken issuance of label) specified in the aforementioned step S206 of the icon table. Subsequently, the weight-scale apparatus 10 in step S213 determines whether or not the icon counter has indicated 0 (zero). The weight-scale apparatus 10 in step S214 upon detecting "0 (zero)" in the icon counter erases the corresponding icon from the icon-displaying area 1042 of the liquid-crystal touch panel 104, and deletes the corresponding entry from the icon table in step S215.

The weight-scale apparatus 10 based on an absence of a touch to the icon in step S205 determines as to whether or not a retrieval key has been operated (touched) in step S216 to input something into an input column for retrieving a PLU code in the query area 1043 of the liquid-crystal touch panel 104. The procedure upon detecting the input of PLU code progresses to step S206 and reads out data corresponding to the input PLU code from the PUL file.

The weight-scale apparatus 10 in step S217 based on an absence of inputting of PLU code makes comparison between a time record in the time memory and a current time with respect to each entry in the icon table; and determines as to whether or not a predetermined length of time, e.g., 15 minutes has passed since the time record in the time memory. Subsequently, the icon of the PLU code that is determined to have passed the predetermined length of time is processed in steps S214 and S215 since timeout has occurred. Accordingly, unnecessary icons displayed on the liquid-crystal touch panel 104 based on an operation error to the tag device 20 by the customer will be erased after the predetermined length of time; therefore, only necessary icons are displayed.

The weight-scale apparatus 10 based on an absence of an icon that has undertaken a timeout determines as to whether or not a retrieval key has been operated (touched) in step S218 to input something into an input column for retrieving a commodity name in the query area 1043 of the liquid-crystal touch panel 104. The weight-scale apparatus 10 based on an input of commodity name retrieves a commodity including the characters that has been input in step S219 from the PLU fi.e. Subsequently, the weight-scale apparatus 10 displays all the retrieved commodity icons in the icon-displaying area 1042 of the liquid-crystal touch panel 104 in step S220. It should be noted that the number of vacant entrys in the icon table limits the number of the retrieved icons. In addition, the step S220 adds the entries of the icons to the icon table in step s221. A current time is recorded in the time memory of this state of icon table, and accordingly, the icon counter establishes 0 (zero). Icons displayed in the icon-displaying area 1042 of the liquid-crystal touch panel 104 in the aforementioned step S220 resulting from a retrieval error are erased after the predetermined length of time in step S214 because the icon counter indicates 0 (zero).

In addition, the weight-scale apparatus 10 in step s222 carries out other processes, e.g., establishing and maintaining various files.

The embodiments of the present invention have been explained above in details with reference to the drawings. However, it should be understood that the drawings and detailed description thereto are not intended to limit the invention to the particular form disclosed; thus, the invention disclosed herein is susceptible to various modifications and alternative forms, i.e., design changes.

For example, the present invention can be adapted to so-called a high-touch PLU system introduced in meat shop, etc. wherein a salesclerk upon operating a tag device 20 provided per commodity displayed in a showcase can display icons on a touch panel weight-scale apparatus on the showcase and issue a label or a receipt.

Also, the tag device 20 may communicate with the weight-scale apparatus 10 via the store-controller 31. Also, a communication method may not be limited to a wire transmission, i.e., optical, wireless, or radiowave transmission may be used.

In addition, a predetermined flag may be established in place of establishing 0 (zero) in the icon counter in step s221 as long as the icon displayed based on retrieval of commodity name can be distinguished from the icon displayed based on the PLU code received from the tag device 20.

Also, commodity data may be read out from the PLU file by means of the key operation section 105 having preset keys provided to the weight-scale apparatus 10.

Also, the single piece price commodity may be distinguished from the per-gram price commodity based not on a presence of weight data in the PLU file, but on the predetermined flag.

In addition, a preferable form of label issued and printed by the weight-scale apparatus 10 may not be limited to commodity base, that is, a label or a receipt may include all the purchasing commodities by repeating the processes of step S205 to S210 for the corresponding number of commodities. A receipt issued by the weight-scale apparatus 10 may include the result of commodity registration conducted in the aforementioned steps.

Also, resulting weight may not be recorded on a label or a receipt; that is, the resulting weight may be transmitted to a cash register or a store controller per customer, or the resulting weight may be stored in a card, etc., that the customer carries along as long as the stored weight is retrievable per customer.

A plurality of icon-displaying areas may be switched if the number of icons on the icon table is increases more than the number of icons that can be displayed on an icon-displaying area of the liquid-crystal touch panel. In this case, switchable operation keys may be provided to the weight-scale apparatus.

Also, data transmitted from the tag device to the weight-scale apparatus may not be limited to the PLU code as long as the data can specify a commodity.

Although the present invention has been described with respect to its preferred embodiments, the present invention is not limited to the embodiments described above. The configuration of the present invention allows for addition, omission, substitution and further modification without departing from the spirit and scope of the present invention. The present invention is not limited to the above descriptions but is limited only by the appended claims.

The invention is claimed as follows:

1. A commodity-vending system comprising:
    terminal devices, provided per type of commodity displayed on store aisles, for transmitting an instruction information that designates the commodity based on the customer's operation; and
    a weight-scale apparatus that weighs each commodity, wherein
    the weight-scale apparatus comprises:
    a storage unit that stores commodity information associated with the commodity;
    a receiver unit that receives the instruction information transmitted from the terminal device; an indicator unit that displays commodity selection-associated information for selecting commodity information of the commodity designated by the previously received instruction information;
    a weight-scale unit that weighs the commodity placed thereon;
    a label-issuing unit that retrieves commodity information from the storage unit in accordance with the commodity selection-associated information designated by the customer, and issues a label based on the retrieved commodity information and the weighed weight; and
    a control unit that stores a counter number indicating the number of receptions of instruction information per commodity; subtracts the counter number corresponding to the label issued per commodity; and erases the corresponding commodity selection-associated information from the indicator unit based on the counter number that indicates zero.

2. The commodity-vending system according to claim 1, wherein the terminal device further comprises an alarm unit that provides an alarm that lasts for a predetermined amount of time signaling that an operation has been conducted by the customer.

3. The commodity-vending system according to claim 1, wherein the commodity selection-associated information is erased from the indicator unit if the commodity selection-associated information displayed by the indicator unit has not been designated for a predetermined length of time.

4. The commodity-vending system according to claim 1, wherein
    the commodity information includes the weight of the commodity per piece and discount information associated with package price established for a predetermined quantity, and
    the weight-scale apparatus calculates commodity quantity based on the weight weighed by the weight-scale unit and the weight per piece of the commodity and issues the label based on the discount information.

5. The commodity-vending system according to claim 1, wherein the weight-scale apparatus further comprises:
    a character-inputting unit; and a query unit that retrieves a commodity having a commodity name including characters input by the character-inputting unit, and
    the weight-scale apparatus displays the commodity selection-associated information of the retrieved commodity on the indicator unit.

6. The commodity-vending system according to claim 1, further comprising a commodity-registering device that undertakes commodity registration upon reading the label issued by the label-issuing unit operated by the customer.

7. The commodity-vending system according to claim 1, wherein the label-issuing unit calculates a price of the commodity placed on the weight-scale unit based on the retrieved commodity information and the weighed weight, and issues the label indicating the calculated price.

8. A commodity-vending system comprising:
   terminal devices, provided per type of commodity displayed on store aisles, for transmitting instruction information that designates the commodity based on the customer's operation; and
   a weight-scale apparatus that weighs and registers each commodity, wherein
   the weight-scale apparatus comprises:
   a storage unit that stores commodity information associated with the commodity;
   a receiver unit that receives the instruction information transmitted from the terminal device; an indicator unit that displays commodity selection-associated information for selecting commodity information of the commodity designated by the previously received instruction information;
   a weight-scale unit that weighs the commodity placed thereon;
   a commodity registration unit that retrieves commodity information from the storage unit in accordance with the commodity selection-associated information designated by the customer, and issues a label based on the retrieved commodity information and the weighed weight;
   a receipt-issuing unit that issues a receipt associated with one or a plurality of the registered commodities; and
   a control unit that stores a counter number indicating the number of receptions of instruction information per commodity; subtracts the counter number corresponding to the label issued per commodity; and erases the corresponding commodity selection-associated information from the indicator unit based on the counter number that indicates zero.

9. The commodity-vending system according to claim 8, wherein the commodity registration unit calculates a price of the commodity placed on the weight-scale unit based on the retrieved commodity information and the weighed weight, and issues the label indicating the calculated price.

10. A weight-scale apparatus for weighing a commodity, comprising:
    a storage unit that stores commodity information associated with the commodity;
    a receiver unit that receives the instruction information transmitted from the terminal device; an indicator unit that displays commodity selection-associated information for selecting commodity information of the commodity designated by the previously received instruction information;
    a weight-scale unit that weighs the commodity placed thereon;
    a recording unit that retrieves commodity information from the storage unit in accordance with the designated commodity selection-associated information, and records the retrieved commodity information and the resulting weight; and
    a control unit that stores a counter number indicating the number of receptions of instruction information per commodity; subtracts the counter number corresponding to the label issued per commodity; and erases the corresponding commodity selection-associated information from the indicator unit based on the counter number that indicates zero.

11. The weight-stale apparatus according to claim 10, wherein the recording unit calculates a price of the commodity placed on the weight-scale unit based on the retrieved commodity information and the weighed weight, and records the retrieved commodity information, the resulting weight, and the calculated price.

* * * * *